United States Patent [19]

Brennan et al.

[11] Patent Number: 4,506,090

[45] Date of Patent: Mar. 19, 1985

[54] AROMATIC POLYOLS MADE FROM POLYETHYLENE TEREPHTHALATE SCRAP, GLYCOLS AND AROMATIC CARBONYL-CONTAINING COMPOUNDS

[75] Inventors: Michael E. Brennan; George P. Speranza, both of Austin, Tex.

[73] Assignee: Texaco Inc., White Plains, N.Y.

[21] Appl. No.: 514,079

[22] Filed: Jul. 15, 1983

[51] Int. Cl.$^3$ .................. C07C 69/08; C07C 69/76; C07C 69/80; C07C 69/82

[52] U.S. Cl. ................................. 560/91; 521/131; 521/159; 521/172; 560/89; 560/92; 560/94

[58] Field of Search .................. 560/91, 89, 92, 94; 521/172, 131, 159

[56] References Cited

U.S. PATENT DOCUMENTS

| | | | |
|---|---|---|---|
| 3,647,759 | 3/1972 | Walker | 521/172 X |
| 3,755,212 | 8/1973 | Dunlop et al. | 521/172 X |
| 3,892,796 | 7/1975 | Leibfried | 521/172 X |
| 4,039,487 | 8/1977 | Kolakowski et al. | 521/172 X |
| 4,048,104 | 9/1977 | Svoboda et al. | 521/173 X |
| 4,092,276 | 5/1978 | Narayan | 521/108 |
| 4,223,068 | 9/1980 | Carlstrom et al. | 521/172 X |
| 4,237,238 | 12/1980 | De Guiseppi et al. | 521/131 |
| 4,246,365 | 1/1981 | Wiedermann et al. | 521/172 |
| 4,435,592 | 3/1984 | Reichel | 560/91 |

*Primary Examiner*—Natalie Trousof
*Assistant Examiner*—Vera C. Clarke
*Attorney, Agent, or Firm*—Jack H. Park; Kenneth R. Priem; David L. Mossman

[57] ABSTRACT

Mixtures of aromatic polyols containing ester functionalities suitable for use as polyol extenders in rigid foams prepared by reacting aromatic carbonyl-containing compounds with an alkylene glycol, the reaction product of which is reacted with recycled polyethylene terephthalate are described. Surprisingly, the process is non-catalytic. These novel polyols may be blended with conventional polyols to yield excellent rigid foams, thus serving as useful polyol extenders.

10 Claims, No Drawings

AROMATIC POLYOLS MADE FROM POLYETHYLENE TEREPHTHALATE SCRAP, GLYCOLS AND AROMATIC CARBONYL-CONTAINING COMPOUNDS

CROSS-REFERENCE TO RELATED APPLICATION

This application is related to U.S. Pat. No. 4,439,550 issued on Mar. 27, 1984, which relates to polyol production from the reaction of polyethylene terephthalate scrap with the reaction product of dibasic acid waste streams and alkylene glycol residues.

BACKGROUND OF THE INVENTION

1. Field of the Invention

The invention relates to polyols for rigid polyurethane foams and more particularly relates to such aromatic polyester polyols which are made from the waste streams of dibasic acids, alkylene glycols and recycled or scrap polyethylene terephthalate.

2. Description of Other Relevant Compounds in the Field

It is known to prepare polyurethane foam by the reaction of polyisocyanate, a polyol and a blowing agent such as a halogenated hydrocarbon, water or both, in the presence of a catalyst. One particular area of polyurethane technology is based upon rigid polyurethane foams.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

The recovery of polyalkylene terephthalate scrap or residues has long been practiced. U.S. Pat. No. 3,344,091 described a process for converting scrap polyester, such as polyethylene terephthalate (PET) into active prepolymer particles by mixing the scrap PET with the glycol originally used in preparing PET, with or without the additional presence of a lower dialkyl ester of the aromatic dicarboxylic acid whose dehydroxylated residues are present in the scrap PET. Chemical Abstracts (CA) vol. 84, paragraph 5638h, relates that British Pat. No. 1,458,486 teaches dialkyl terephthalates, such as dimethyl terephthalate (DMT), recovery by heating scrap PET with monohydric alcohols with a catalyst and a sequestering agent.

PET scrap may be recovered by depolymerization with glycols as seen in CA 78:160452n, abstract to East German Pat. No. 92,801. U.S. Pat. No. 4,166,896 teaches that a mixture of glycols and oligomers (such as lower molecular weight polyesters of terephthalic acid and a glycol) may be depolymerized (transesterified) by heating. Subsequently, ethylenically unsaturated dicarboxylic acids or their anhydrides are added and the mixture is heated again. An unsaturated polyester resin is produced. A suitable dicarboxylic acid is phthalic acid, the anhydride of which is also useful in this process.

Scrap polyalkylene terephthalate, such as polyethylene terephthalate is known to be incorporated into polyurethanes. For examples, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759.

U.S. Pat. No. 3,755,212 teaches air blown polyurethane foams prepared from ester-modified polyether polyols, a polyisocyanate and a polyurethane catalyst. The modifying agents for reaction with the polyols apparently are internal anhydrides of polycarboxylic acids, such as phthalic anhydride. Rigid polyurethane foams may be made from a fluid polyol made by hydrogenating a DMT process residue, then reacting the hydrogenation product with an alcoholic material, according to U.S. Pat. No. 3,892,796. Further, U.S. Pat. No. 4,186,257 reveals that high molecular weight polyurethanes from polyols linked with ester groups may be made by reacting diols with phthalic acid or DMT. Polybutylene terephthalate diols and polyhexamethylene terephthalate diols are also used.

Brominated ester-containing polyether polyols may be prepared by the sequential reaction of a polyether polyol with 4,5-dibromohexahydrophthalic anhydride and an alkylene oxide according to U.S. Pat. No. 4,069,207. Flame-retardant polyurethane foams are prepared using these modified polyols. Also relevant is East German Pat. No. 122,986 cited in CA 86:190834w which teaches that polyurethanes may be manufactured from polyester polyols made by condensation and transesterification of PET synthesis distillation residues with polyols, polyamino alcohols and fatty acid ester diols.

There is still a need for a rigid polyurethane foam that has a high flame resistance. Part of the problem with the polyols of U.S. Pat. No. 3,647,759 is that they are not very compatible with trichlorofluoromethane, the gas entrapped in closed-cell rigid foams, which accounts for the excellent insulating properties of these foams.

SUMMARY OF THE INVENTION

The invention concerns a mixture of aromatic polyols having hydroxyl and ester functionalities for use in preparing rigid foams, being produced by the process comprising reacting, in the absence of a catalyst, an aromatic carbonyl-containing compound selected from the group consisting of aromatic dicarboxylic acids, aromatic esters and aromatic anhydrides with an alkylene glycol to form a precondensate and subsequently transesterifying, in the absence of a catalyst, recycled polyethylene terephthalate with the precondensate.

DETAILED DESCRIPTION OF THE PREFERRED EMBODIMENTS

In general, it has been discovered that rigid foams may be made using the mixture of aromatic polyester polyols of this invention either alone or as polyol extenders together with other polyols. In addition, such a polyol mixture is compatible with the trichlorofluoromethane blowing agent. The novel aromatic polyester polyol mixtures are made by using a recycled polyethylene terephthalate (PET). This may be any scrap residue from old polyethylene terephthalate which contains compounds which have the moiety

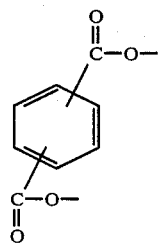

Generally, the scrap or recycled polyethylene terephthalate may be in any particulate form. A frequently seen form is fragmentized soft drink bottles which appear as clear or colored chips. Polyethylene film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent is also useful.

The polyester polyol with which the polyethylene terephthalate scrap is reacted is produced by the reaction or esterification of an aromatic carbonyl-containing compound, as noted before. These materials include such compounds as aromatic dicarboxylic acids, aromatic esters and aromatic anhydrides. It is especially preferred that the aromatic carbonyl compound be phthalic anhydride.

Preferably, the alkylene glycol has the formula

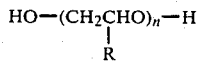

where R is hydrogen or lower alkyl of one to four carbon atoms and n is from 1 to 3. Glycols which meet this definition are ethylene glycol, propylene glycol (1,2-propylene glycol), diethylene glycol (DEG), dipropylene glycol, and triethylene glycol (TEG), among others. The glycol may be a residue or flash-separated glycol.

The polyester polyol which results from the reaction of the carbonyl-containing compound and an alkylene glycol may be called a precondensate.

The proportions of the reactants should be such as to give a resulting mixture of aromatic polyester polyols which have an average OH (hydroxyl) number within the desired range of about 100 to 400. The saponification number of the scrap polyethylene terephthalate (a measure of transesterification sites) should be considered in selecting proportions, if obtainable. One PET unit has a molecular weight of 192.2. Preferably, the approximate mole ratio of aromatic carbonyl-containing compound to alkylene glycol to scrap polyethylene terephthalate may be about 1.0/2.0–5.0/1.0. It is especially preferred that the ratios be 1/2–4/1, respectively. These proportions could vary 5% in either direction. What actually forms the "polyol" of this invention is a mixture of polyols having ester functions, even though the mixture is sometimes referred to as a singular "polyol".

Generally, both reactions need heat between ambient and about 300° C. to proceed. Preferably, the temperature for the second, esterification step should be between 200° and 250° C. It is especially preferred that the temperature be 210° to 220° C. Unlike some prior art processes, both steps are non-catalytic. The pressure can be atmospheric, subatmospheric or autogenous. The polyol should have a hydroxyl number in the range of 100 to 400, with an especially preferred hydroxyl number range of 150 to 400.

These mixtures can serve as polyol extenders when they are blended with conventional polyols for use in polyurethane foams. The polyols of this invention can also be used alone to prepare isocyanurate foams.

There is good compatibility of the polyols of this invention with trichlorofluoromethane. Trichlorofluoromethane, sold under the tradename FREON®R11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200–800. Usually the polyether polyol comprises 0–95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2–8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alphamethyl glucoside.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL ®R-350-X and THANOL R-650-X polyols. These polyols are prepared by reacting from 2 to 3 moles of propylene oxide with one mole of the Mannich reaction product of a mole of phenol or nonylphenol with one or two moles of formaldehyde and diethanolamine.

The final polyol combination more preferably comprises 0-95 percent by weight of said polyether polyol and 100-5 percent by weight of aromatic polyester polyol. Although the aromatic polyols of this invention may be used alone, it is preferred that they be present in an amount of from 30 to 70 weight percent of the polyol blend. The polyol combination in many instances has a total hydroxyl number ranging from about 100 to about 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are made from DMT residues.

Surfactant agents, better known as silicone oils, are added to serve as a cell stabilizer. Some representative materials are sold under the names of L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperizine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyols mixtures are used as polyol extenders to prepare foams.

The polyol extenders of this invention will be compared with some commercial polyol extenders. Hercules, Inc., Wilmington, Del., sells dimethyl terephthalate (DMT) residues under the tradename of TERATE ®101. Hercules also sells TERATE 200 series resins which are DMT resins modified with a glycol as seen in U.S. Pat. Nos. 4,237,238 and 3,647,759. The TERATE 200 series resins are useful as polyol extenders. Similar DMT residues having a different composition but still containing the aromatic, esters and acids are also sold by DuPont and others. Freeman Chemical Company produces a polyol extender known as CHEMPOL ®30-2150 which has a hydroxyl number of about 210. It is the reaction product of recycled PET, diethylene glycol and pure dimethyl glutarate, which is quite expensive. See U.S. Pat. Nos. 4,223,068 and 4,048,104 to Freeman Chemical Co.

It may be readily seen from the examples that the polyol mixtures of this invention work as well in the role of polyol extenders as do commercially available materials. Many modifications may be made in the polyol mixtures of this invention and their method of production without departing from the spirit and scope of the invention which is defined only in the appended claims. For example, one skilled in the art could adjust the temperature, pressure, proportions and modes of additions to provide polyol mixtures that give foams with optimal properties.

SYNTHESIS OF AROMATIC POLYESTER POLYOL

To simulate a precondensate product from the first step of the inventive method, Stephan Chemical's Polyol X-3152 was used. Polyol X-3152 is a precondensate of phthalic anhydride with about 2 moles of diethylene glycol (DEG), a hydroxyl number of 309, an acid number of 3.14, a saponification number of 330.59, 0.05% water and a viscosity at 25° C. of 2,281 centistokes. See also foam preparations from this polyol, below.

EXAMPLES 1-4

A 1-liter, three-neck round bottom flask, equipped with a mechanical stirrer, thermometer (Therm-O-Watch), a water cooled distillation head and a tared receiver, was charged with 363.2 g (1.0 mole) X-3152, optionally DEG (0.0-174.9 g; 0.0-1.65 moles; 0.0-82.5 mole% excess) and 192.2 g (1.0 equivalent) polyethylene terephthalate (PET) recycled bottle resin. The whole was then well stirred while rapidly heating to 210°-220° C. and then held for 6.0 hours. Overhead "lights" were less than 0.5% of total charge and were discarded. After cooling, the liquid reaction products (>99% recovery) were isolated and analyzed. Results follow:

| Polyol No. | 1 | 2 | 3 | 4 |
| --- | --- | --- | --- | --- |
| Mole % excess DEG | 0 | 16.5 | 35.5 | 82.5 |
| Hydroxyl number | 196 | 249 | 294 | 390 |
| Acid number | 2.32 | 1.57 | 2.92 | 2.46 |
| Saponification No. | 419.74 | 385.66 | 361.97 | 321.50 |
| Water % | 0.10 | 0.03 | 0.08 | 0.10 |
| Viscosity (25° C.), cs | 64,237 | 15,833 | 5,662 | 1,283 |

The product structures were also confirmed by nuclear magnetic resonance spectra.

Freon R-11 ($FCCl_3$) solubility in polyol No. 1 was ≧16.7%. R-11 solubility in TERATE ®203 was <10%.

EXAMPLE 5

The apparatus previously described was charged with 148.1 g (1.0 mole) phthalic anhydride, 285.1 g (2.7 moles) DEG and 192.2 g (1.0 equivalent) PET bottle resin. The whole was stirred and heated to 210° C. over 1.5 hours and then held at 210°-220° C. for 6.0 hours. Overhead liquid (22.0 g) was collected at 87°-100° C./172°-220° C.(pot)/1 atm. and consisted of 99.0% water. The product (594.0 g), a mobile liquid, was isolated as before and analyzed. Total recovery was 98.5%. Results follow:

| | |
| --- | --- |
| Hydroxyl number | 311 |
| Acid number | 2.44 |
| Saponification number | 364.56 |
| Water, % | 0.09 |
| Viscosity (25° C.), cs | 4,954 |

Fire Retarded Rigid Polyurethane Foams

The experimental aromatic polyester polyols were used as extender polyols in THANOL®R-350-X and THANOL R-650-X formulations. Comparative examples with the extenders TERATE®203 made by Hercules, Inc. and X-3152 made by Stepan Chemical Co. are also presented. Generally, properties are better or comparable for those foams using the polyols of this invention; e.g., see compressive strengths.

Formulation components were mixed at 2700 rpm and poured into an 8"×8"×12" (600 g pour) open mold and allowed to rise. The resulting foams were allowed to stand at room temperature for at least three days before testing. Formulations and physical property data are listed below.

EXAMPLE 6

| | THANOL R-350-X Foams | | | | | | |
|---|---|---|---|---|---|---|---|
| | A | B | C | D | E | F | G |
| Formulation, pbw | | | | | | | |
| THANOL R-350-X[1] (OH = 534) | 25.5 | 25.3 | 25.8 | 25.2 | 24.8 | 23.9 | 24.6 |
| TERATE 203 (OH = 318) | 10.9 | — | — | — | — | — | — |
| X-3152 (OH = 309) | — | 10.8 | — | — | — | — | — |
| Polyol No. 1 (OH = 196) | — | — | 11.0 | — | — | — | — |
| Polyol No. 2 (OH = 249) | — | — | — | 10.8 | — | — | — |
| Polyol No. 3 (OH = 294) | — | — | — | — | 10.6 | — | — |
| Polyol No. 4 (OH = 390) | — | — | — | — | — | 10.3 | — |
| Polyol No. 5 (OH = 311) | — | — | — | — | — | — | 10.6 |
| ANTIBLAZE 80[2] | 5.0 | 5.0 | 5.0 | 5.0 | 5.0 | 5.0 | 5.0 |
| Water | 0.3 | 0.2 | 0.2 | 0.2 | 0.2 | 0.2 | 0.2 |
| FREON R-11B[3] | 13.0 | 12.0 | 12.0 | 12.0 | 12.0 | 12.0 | 12.0 |
| L-5420[4] | 0.5 | 0.5 | 0.5 | 0.5 | 0.5 | 0.5 | 0.5 |
| FOMREZ UL-32[5] | 0.01 | 0.01 | 0.01 | 0.01 | 0.01 | 0.01 | 0.01 |
| MONDUR® MR[6] (index = 1.2) | 44.8 | 46.2 | 45.5 | 46.3 | 46.9 | 48.1 | 47.1 |
| Times (secs.), | | | | | | | |
| Mixing | 10 | 8 | 8 | 8 | 8 | 8 | 8 |
| Cream | 15 | 14 | 15 | 16 | 16 | 16 | 16 |
| Gel | 57 | 61 | 63 | 70 | 60 | 59 | 66 |
| Tack free | 83 | 91 | 95 | 99 | 82 | 80 | 91 |
| Rise | 115 | 132 | 137 | 140 | 137 | 131 | 134 |
| Initial surface friability | None | None | None | None | None | None | None |
| Foam appearance | Good | Good | Good | Good | Good | Good | Good |
| Physical Properties | | | | | | | |
| Density (lbs/ft$^3$) | 1.68 | 1.84 | 1.91 | 1.93 | 1.88 | 1.85 | 1.85 |
| K-factor | 0.110 | 0.119 | 0.119 | 0.123 | 0.124 | 0.119 | 0.128 |
| Comp. str. (psi) | | | | | | | |
| with rise | 37.13 | 41.83 | 42.26 | 41.58 | 42.72 | 32.95 | 39.63 |
| against rise | 12.69 | 13.14 | 13.09 | 14.87 | 13.93 | 13.16 | 12.76 |
| Heat distortion (°C.) | 129 | 110 | 110 | 112 | 114 | 142 | 112 |
| Closed cells, % | 93.64 | 92.59 | 92.67 | 91.96 | 92.45 | 92.47 | 91.33 |
| Friability, (% wt. loss, 10 min.) | 2.35 | 2.27 | 9.41 | 2.77 | 1.12 | 0.92 | 5.61 |
| ASTM 1692 Burn, in/min (BHA) | 2.08 | 2.20 | 1.54 | 1.75 | 2.04 | 2.23 | 2.17 |
| Butler Chimney Test | | | | | | | |
| Flame height, in. | >11 | >11 | >11 | >11 | >11 | >11 | >11 |
| Secs. to extinguish | 14 | 20 | 18 | 12 | 14 | 16 | 11 |
| % wt. retained | 78.2 | 66.6 | 59.6 | 74.6 | 79.9 | 67.1 | 69.9 |

[1] Nitrogen-containing polyol made by Texaco Chemical Company according to U.S. Pat. No. 3,297,597.
[2] Tris-(2-chloropropyl) phosphate) made by Mobil Chemical Corp.
[3] Trichlorofluoromethane made by E. I. duPont de Nemours & Co.
[4] A silicon surfactant sold by Union Carbide Corp.
[5] A tin catalyst sold by Witco Chemical Corp.
[6] A polymeric isocyanate sold by Mobay Chemical Corp.

EXAMPLE 7

| | THANOL R-650-X Foams | | | | | | |
|---|---|---|---|---|---|---|---|
| | H | I | J | K | L | M | N |
| Formulation, pbw | | | | | | | |
| THANOL R-650-X (OH = 442) | 27.2 | 27.4 | 28.1 | 27.4 | 26.9 | 25.9 | 26.7 |
| TERATE 203 (OH = 318) | 11.7 | — | — | — | — | — | — |
| X-3152 (OH = 309) | — | 11.7 | — | — | — | — | — |
| Polyol No. 1 (OH = 196) | — | — | 12.0 | — | — | — | — |
| Polyol No. 2 (OH = 249) | — | — | — | 11.8 | — | — | — |
| Polyol No. 3 (OH = 294) | — | — | — | — | 11.6 | — | — |
| Polyol No. 4 (OH = 390) | — | — | — | — | — | 11.1 | — |
| Polyol No. 5 (OH = 311) | — | — | — | — | — | — | 11.5 |
| ANTIBLAZE 80 | 5.0 | 5.0 | 5.0 | 5.0 | 5.0 | 5.0 | 5.0 |
| Water | 0.3 | 0.2 | 0.2 | 0.2 | 0.2 | 0.2 | 0.2 |
| FREON R-11B | 13.0 | 12.0 | 12.0 | 12.0 | 12.0 | 12.0 | 12.0 |
| L-5420 | 0.5 | 0.5 | 0.5 | 0.5 | 0.5 | 0.5 | 0.5 |

-continued

| | THANOL R-650-X Foams | | | | | | |
|---|---|---|---|---|---|---|---|
| | H | I | J | K | L | M | N |
| FOMREZ UL-32 | 0.01 | 0.01 | 0.01 | 0.01 | 0.01 | 0.01 | 0.01 |
| MONDUR MR (index = 1.2) | 42.3 | 43.2 | 42.2 | 43.1 | 43.8 | 45.3 | 44.1 |
| Times (secs.), | | | | | | | |
| Mixing | 10 | 8 | 6 | 6 | 6 | 6 | 6 |
| Cream | 12 | 13 | 13 | 14 | 14 | 14 | 14 |
| Gel | 50 | 54 | 60 | 62 | 52 | 53 | 55 |
| Tack free | 60 | 73 | 84 | 87 | 73 | 70 | 76 |
| Rise | 84 | 116 | 133 | 144 | 134 | 128 | 134 |
| Initial surface friability | None | None | None | None | None | None | None |
| Foam appearance | Good | Good | Good | Good | Good | Good | Good |
| Physical Properties | | | | | | | |
| Density (lbs/ft$^3$) | 1.78 | 2.00 | 2.02 | 2.03 | 2.02 | 1.93 | 1.99 |
| K-factor | 0.113 | 0.113 | 0.119 | 0.121 | 0.118 | 0.118 | 0.121 |
| Comp. str. (psi), | | | | | | | |
| with rise | 35.08 | 41.79 | 43.27 | 42.55 | 41.92 | 40.14 | 40.92 |
| against rise | 12.58 | 12.82 | 13.03 | 13.96 | 15.07 | 13.77 | 13.00 |
| Heat distortion (°C.) | 138 | 120 | 125 | 100 | 104 | 132 | 108 |
| Closed cells, % | 94.86 | 93.06 | 93.52 | 92.54 | 92.84 | 92.84 | 92.00 |
| Friability (% wt. loss, 10 min.) | 2.37 | 2.12 | 3.28 | 1.67 | 0.70 | 1.60 | 2.93 |
| ASTM 1692 Burn, in/min (BHA) | 2.36 | 2.09 | 1.37 | 1.72 | 1.84 | 2.02 | 1.70 |
| Butler Chimney Test | | | | | | | |
| Flame height, in. | 9.0 | >11 | >11 | >11 | >11 | >11 | >11 |
| Secs. to extinguish | 12.3 | 15 | 12 | 16 | 15 | 14 | 14 |
| % wt. retained | 79.0 | 69.4 | 68.0 | 70.7 | 65.2 | 68.4 | 70.3 |

EXAMPLE 8

Polyisocyanurate Foams

The inventive aromatic polyester polyol extenders were used as the sole polyol in isocyanurate formulations. Comparative examples for TERATE 203 or X-3152 are unavailable due to B-component incompatibility for these two extender polyols. Procedure was the same as in Section B. Formulations and physical properties are listed below.

| | O | P | Q | R | S |
|---|---|---|---|---|---|
| Formulation, pbw | | | | | |
| Polyol No. 1 (OH = 196) | 25.7 | — | — | — | — |
| Polyol No. 2 (OH = 249) | — | 21.6 | — | — | — |
| Polyol No. 3 (OH = 294) | — | — | 19.1 | — | — |
| Polyol No. 4 (OH = 390) | — | — | — | 15.2 | — |
| Polyol No. 5 (OH = 311) | — | — | — | — | 18.2 |
| Freon R-11B | 12.0 | 12.0 | 12.0 | 12.0 | 12.0 |
| DC-193[1] | 0.5 | 0.5 | 0.5 | 0.5 | 0.5 |
| T-45[2] | 1.5 | 1.5 | 1.5 | 1.5 | 1.5 |
| MONDUR MR (index = 5.0) | 60.3 | 64.4 | 66.9 | 70.8 | 67.8 |
| Times (secs.), | | | | | |
| Mixing | 4 | 4 | 4 | 4 | 4 |
| Cream | 7 | 8 | 8 | 9 | 8 |
| Gel | 21 | 20 | 23 | 23 | 23 |
| Tack free | 31 | 28 | 31 | 28 | 26 |
| Rise | 71 | 63 | 63 | 64 | 30 |
| Initial surface friability | Yes | Yes | Yes | Yes | Yes |
| Foam appearance | Good | Fair | Good | Good | Good |
| Physical Properties | | | | | |
| Density (lbs/ft$^3$) | 1.99 | 2.01 | 1.90 | 1.97 | 1.89 |
| K-factor | 0.122 | 0.124 | 0.122 | 0.124 | 0.124 |
| Comp. str. (psi), | | | | | |
| with rise | 43.10 | 42.56 | 34.65 | 33.63 | 34.72 |
| against rise | 13.13 | 15.90 | 13.49 | 15.73 | 13.62 |
| Heat distortion (°C.) | >225 | >225 | >225 | >225 | >225 |
| Closed cells, % | 92.54 | 91.45 | 92.17 | 92.71 | 92.05 |
| Friability (% wt. loss, 10 min.) | 38.31 | 52.05 | 45.39 | 62.11 | 50.66 |
| ASTM 1692 Burn, in/min (BHA) | 1.87 | 1.43 | 1.27 | 1.24 | 1.45 |
| Butler Chimney Test | | | | | |
| Flame height, in. | 5.83 | 5.33 | 5.50 | 5.00 | 5.50 |
| Secs. to extinguish | 10.67 | 10.00 | 10.00 | 9.50 | 10.17 |
| % wt. retained | 93.6 | 93.6 | 94.8 | 94.2 | 92.9 |

[1]Silicone surfactant made by Dow-Corning.
[2]Potassium octoate in glycol made by M & T Chemical Co.

We claim:

1. A mixture of aromatic polyols having hydroxyl and ester functionalities for use in preparing polyurethane foams, being produced by the process comprising
   a. reacting an aromatic carbonyl-containing compound selected from the group consisting of aromatic dicarboxylic acids, aromatic esters and aromatic anhydrides, with an alkylene glycol, in the absence of a catalyst, to form a precondensate and
   b. transesterifying recycled polyethylene terephthalate with the precondensate at a temperature between 200° and 250° C. in the absence of a catalyst
where the mole ratios of aromatic carbonyl-containing compound to alkylene glycol to recycled polyethylene terephthalate fall within the range of about 1.0:2.0–5.0:1.0, respectively, and the resultant mixture of aromatic polyols has an average hydroxyl number of between 100 and 400.

2. The mixture of aromatic polyols of claim 1 in which the aromatic carbonyl-containing compound is phthalic anhydride.

3. The mixture of aromatic polyols of claim 1 in which the alkylene glycol has the formula

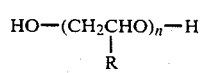

where R is hydrogen or lower alkyl of 1 to 4 carbon atoms and n is from 1 to 3.

4. The mixture of aromatic polyols of claim 3 in which the alkylene glycol is diethylene glycol.

5. A mixture of aromatic polyols having hydroxyl and ester functionalities for use in preparing polyurethane foams, being produced by the process comprising
   a. reacting an aromatic carbonyl-containing compound selected from the group consisting of aromatic dicarboxylic acids, aromatic esters and aromatic anhydrides, with an alkylene glycol having the formula

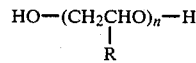

where R is hydrogen or lower alkyl of 1 to 4 carbon atoms and n is from 1 to 3, in the absence of a catalyst to form a precondensate,
   b. transesterifying recycled polyethylene terephthalate with the precondensate at a temperature between 200° and 250° C. in the absence of a catalyst where the mole ratios of aromatic carbonyl-containing compound to alkylene glycol to recycled polyethylene terephthalate fall within the range of 1.0:2.0–4.0:1.0 and the resultant mixture of aromatic polyols has an average hydroxyl number of between 100 and 400.

6. The mixture of aromatic polyols of claim 5 in which the aromatic carbonyl-containing compound is phthalic anhydride and the alkylene glycol is diethylene glycol.

7. A method for the production of a mixture of aromatic polyols having hydroxyl and ester functionalities comprising
   a. reacting an aromatic carbonyl-containing compound selected from the group consisting of aromatic dicarboxylic acids, aromatic esters and aromatic anhydrides, with an alkylene glycol, in the absence of a catalyst, to form a precondensate and
   b. transesterifying recycled polyethylene terephthalate with the precondensate at a temperature between 200° and 250° C. in the absence of a catalyst where the mole ratio of aromatic carbonyl-containing compound to alkylene glycol to recycled polyethylene terephthalate fall within the range of about 1.0:2.0–5.0:1.0, respectively, and the resultant mixture of aromatic polyols has an average hydroxyl number of between 100 and 400.

8. The method of claim 7 in which the aromatic carbonyl-containing compound is phthalic anhydride.

9. The method of claim 7 in which the alkylene glycol has the formula

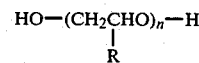

where R is hydrogen or lower alkyl of 1 to 4 carbon atoms and n is from 1 to 3.

10. The method of claim 9 in which the alkylene glycol is diethylene glycol.